(12) United States Patent
Park et al.

(10) Patent No.: US 10,595,294 B1
(45) Date of Patent: *Mar. 17, 2020

(54) METHOD FOR SUPPORTING EFFICIENT PDU SESSION ACTIVATION AND DEACTIVATION IN CELLULAR NETWORKS

(71) Applicant: Samsung Electronics Co., Ltd., Suwon-si, Gyeonggi-do (KR)

(72) Inventors: Jungshin Park, Seoul (KR); Jinsung Lee, Suwon-si (KR); Jicheol Lee, Suwon-si (KR); Kisuk Kweon, Suwon-si (KR); Sangjun Moon, Seoul (KR); Beomsik Bae, Suwon-si (KR); Hyungho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/673,629

(22) Filed: Nov. 4, 2019

Related U.S. Application Data

(63) Continuation of application No. 16/368,360, filed on Mar. 28, 2019, now Pat. No. 10,470,153, which is a
(Continued)

(30) Foreign Application Priority Data

Mar. 20, 2017 (KR) .......................... 10-2017-0034671
Aug. 8, 2017 (KR) .......................... 10-2017-0100159

(51) Int. Cl.
*H04W 60/06* (2009.01)
*H04W 8/02* (2009.01)
(Continued)

(52) U.S. Cl.
CPC ............. *H04W 60/06* (2013.01); *H04W 8/02* (2013.01); *H04W 76/34* (2018.02); *H04W 28/06* (2013.01); *H04W 64/00* (2013.01); *H04W 76/15* (2018.02)

(58) Field of Classification Search
CPC ..... H04W 8/08; H04W 8/02; H04W 36/0022; H04W 88/16; H04W 36/12; H04W 76/12; H04W 28/02
See application file for complete search history.

(56) References Cited

U.S. PATENT DOCUMENTS 10,251,147 B2 * 4/2019 Park ....................... H04W 60/06
10,470,152 B2 * 11/2019 Park ........................ H04W 8/02
(Continued)

*Primary Examiner* — Dung Hong

(57) ABSTRACT

A communication method and system converges a 5G communication system for supporting higher data rates beyond a 4G system with an IoT technology. The system and method may be applied to intelligent services based on the 5G communication technology and the IoT-related technology, such as smart home, smart building, smart city, smart car, connected car, health care, digital education, smart retail, security and safety services. Embodiments provide a scheme for efficiently operating an UP connection of a session in case where a terminal has a plurality of sessions in a mobile communication system, such as a 5G system, having a network structure in which an AMF for mobility management and an SMF for session management are separated from each other. A terminal (UE) can optimize a non-access stratum (NAS) signaling message, and can perform data transmission/reception with low latency.

20 Claims, 23 Drawing Sheets

Related U.S. Application Data continuation of application No. 15/926,953, filed on Mar. 20, 2018, now Pat. No. 10,251,147.

(51) Int. Cl.
*H04W 76/34* (2018.01)
*H04W 64/00* (2009.01)
*H04W 76/15* (2018.01)
*H04W 28/06* (2009.01)

(56) References Cited

U.S. PATENT DOCUMENTS

| | | |
|---|---|---|
| 10,470,153 B2 * | 11/2019 | Park .................. H04W 8/02 |
| 2016/0006696 A1 | 1/2016 | Donley et al. |
| 2017/0041968 A1 * | 2/2017 | Jin .................. H04W 72/1236 |
| 2017/0339609 A1 * | 11/2017 | Youn .................. H04W 76/11 |
| 2018/0098251 A1 * | 4/2018 | Li .................. H04W 36/0016 |
| 2018/0192289 A1 * | 7/2018 | Dao .................. H04L 63/08 |
| 2018/0192337 A1 * | 7/2018 | Ryu .................. H04W 36/0066 |
| 2018/0199398 A1 * | 7/2018 | Dao .................. H04W 76/10 |
| 2018/0227743 A1 * | 8/2018 | Faccin .................. H04L 65/1069 |
| 2018/0227871 A1 * | 8/2018 | Singh .................. H04W 60/00 |
| 2018/0227872 A1 * | 8/2018 | Li .................. H04W 8/02 |
| 2018/0262423 A1 * | 9/2018 | Roeland .................. H04L 47/20 |

* cited by examiner

FIG. 6

| PDU Session ID | Serving SMF | PDU Session Status | Sync Indication with NAS Signaling Connection |
|---|---|---|---|
| 1 | SMF1 | Active | On |
| 2 | SMF1 | Inactive | Off |
| 3 | SMF2 | Active | Off |

METHOD FOR SUPPORTING EFFICIENT PDU SESSION ACTIVATION AND DEACTIVATION IN CELLULAR NETWORKS

CROSS-REFERENCE TO RELATED APPLICATIONS

This application is a continuation of application Ser. No. 16/368,360, filed Mar. 28, 2019, which is a continuation of application Ser. No. 15/926,953, filed Mar. 20, 2018, now U.S. Pat. No. 10,251,147, which claims priority to Korean Patent Application No. 10-2017-0034671, filed Mar. 20, 2017 and Korean Patent Application No. 10-2017-0100159, filed Aug. 8, 2017, the disclosures of which are incorporated herein by reference in its entirety.

BACKGROUND

1. Field

The present disclosure relates to a method for efficiently managing an UP connection resource of a PDU session in a cellular wireless communication system.

2. Description of Related Art

In order to meet the demand for wireless data traffic that is on an increasing trend after commercialization of 4G communication systems, efforts have been made to develop improved 5G or pre-5G communication system. For this reason, the 5G or pre-5G communication system is also called a beyond 4G network communication system or a post LTE system. In order to achieve high data rate, implementation of a 5G communication system in an ultrahigh frequency (mmWave) band (e.g., like 60 GHz band) has been considered.

In order to mitigate a path loss of radio waves and to increase a transfer distance of the radio waves in the ultrahigh frequency band, technologies of beamforming, massive MIMO, full dimension MIMO (FD-MIMO), array antennas, analog beamforming, and large scale antennas for the 5G communication system have been discussed. Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation. In addition, in the 5G system, hybrid FSK and QAM modulation (FQAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

On the other hand, the Internet, which is a human centered connectivity network where humans generate and consume information, is now evolving to the Internet of things (IoT) where distributed entities, such as things, exchange and process information. The Internet of everything (IoE), which is a combination of the IoT technology and big data processing technology through connection with a cloud server, has emerged. As technology elements, such as sensing technology, wired/wireless communication and network infrastructure, service interface technology, and security technology, have been demanded for IoT implementation, a sensor network for machine-to-machine connection, machine-to-machine (M2M) communication, machine type communication (MTC), and so forth have been recently researched.

Such an IoT environment may provide intelligent Internet technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between the existing information technology (IT) and various industries.

Accordingly, various attempts have been made to apply the 5G communication system to IoT networks. For example, technologies of sensor network, machine to machine (M2M) communication, and machine type communication (MTC) have been implemented by techniques for beam-forming, MIMO, and array antennas, which correspond to the 5G communication technology. As the big data processing technology as described above, application of a cloud radio access network (cloud RAN) would be an example of convergence between the 5G technology and the IoT technology.

On the other hand, in order to achieve evolution from the existing 4G LTE system into the 5G system, 3GPP that takes charge of the cellular mobile communication standard has named a new core network structure a 5G core (5GC) and has proceeded with the standardization thereof.

As compared with an evolved packet core (EPC) that is an existing 4G network core, the 5GC supports the following discriminated functions. The first is introduction of a network slice function. As the 5C requirements, the 5GC should support various types of terminals and services: e.g., enhanced mobile broadband (EMBB), ultra-reliable low latency communications (URLLC), and massive machine type communications (mMTC). Such terminals/services have different requirements used in respective core networks. For example, in case of an eMBB service, high data rate may be used, whereas in case of a URLLC service, high stability and low latency may be used.

A technology proposed to satisfy such various service requirements is a network slice scheme. Network slice is a method for virtualizing one physical network to make several logic networks, and respective network slice instances (NSIs) may have different characteristics. This becomes possible by making the respective NSIs have network functions (NF) that suit the characteristics. Several 5G services can be efficiently supported by allocating to terminals the NSIs that suit the characteristics of services used for the respective terminals.

The second may be easiness in network virtualization paradigm support through separation between a mobility management function and a session management function. In the existing 4G LTE, all terminals can be provided with services in a network through signaling exchange with single-core equipment that is called a mobility management entity (MME) taking charge of registration, authentication, mobility management, and session management functions. However, in the 5G, since the number of terminals is explosively increased, and mobility and traffic/session characteristics to be supported are subdivided in accordance with terminal types, scalability to add entities for necessary functions is lowered in case where all functions are supported by the single equipment such as the MME. Accordingly, in order to improve the scalability in function/implementation complexity of the core equipment taking charge of control plane and signaling load, various functions have been developed based on a structure for separating the mobility management function and the session management function from each other.

FIG. 1 illustrates a network architecture for a 5G system. An access and mobility management function (AMF) of managing terminal mobility and network registration and a session management function (SMF) of managing an end-to-end session are separated from each other, and may send and receive signaling through an N11 interface.

Third, a 5G terminal may set up a plurality of packet data unit (PDU) sessions for data communication with one data network name (DNN) such as Internet. Accordingly, the 5G terminal supports a function of making and removing UP connection (i.e., data radio bearer+N3 tunnel) between a terminal (UE) and a core network (CN) independently for respective PDU sessions.

Basically, if a terminal goes to a CM-IDLE state, it releases the UP connection of all PDU sessions. The terminal in the CM-IDLE state remakes only the UP connection of the PDU session to which mobile-originated (MO) or mobile-terminated (MT) traffics belong when returning again to a CM-CONNECTED state due to the mobile-originated (MO) or mobile-terminated (MT) traffics.

The terminal in the CM-CONNECTED state may perform an activation procedure of additionally making the UP connection with respect to the PDU session in which the UP connection has not yet been made. Further, the terminal in the CM-CONNECTED state can maintain only the UP connection of the PDU session in which the traffic occurs by performing a procedure of deactivating the UP connection of the activated PDU session through the network entity (e.g., AMF or SMF) of the core network, and thus UP connection resources can be saved. By independently activating the UP connection of the PDU session as described above, the signaling and UP connection resources can be additionally saved when the terminal performs a handover.

SUMMARY

An aspect of the present disclosure proposes a method for activating an UP connection resource of a specific PDU session in accordance with whether NAS signaling is connected between a terminal and an AMF during management of UP connection resources of independent (or selective) PDU sessions, and also proposes a method for a terminal in a CM-IDLE state to efficiently operate an N9 tunnel of the PDU session including a plurality of UPFs.

In accordance with an aspect of the present disclosure, a method by a session management function (SMF) entity for managing a protocol data unit (PDU) session in a wireless communication system includes transmitting a first message requesting a location change notification for a terminal in an idle state to an access and mobility management function (AMF) entity; receiving a second message including information on a changed location of the terminal from the AMF entity; and determining whether to maintain at least one of a plurality of user plane functions (UPFs) included in the PDU session for the terminal based on the second message.

In accordance with another aspect of the present disclosure, a method by an access and mobility management function (AMF) entity for managing a protocol data unit (PDU) session in a wireless communication system includes receiving a first message requesting a location change notification for a terminal in an idle state from a session management function (SMF) entity; and transmitting a second message including information on a changed location of the terminal to the SMF entity based on the first message if the location change of the terminal is detected, wherein the second message is used to determine whether to maintain at least one of a plurality of user plane functions (UPFs) included in the PDU session for the terminal by the SMF entity.

In accordance with still another aspect of the present disclosure, a session management function (SMF) entity in a wireless communication system includes a transceiver configured to transmit a first message requesting a location change notification for a terminal in an idle state to an access and mobility management function (AMF) entity; and a controller configured to control the transceiver to receive a second message including information on a changed location of the terminal from the AMF entity and to determine whether to maintain at least one of a plurality of user plane functions (UPFs) included in a protocol data unit (PDU) session for the terminal based on the second message.

In accordance with yet still another aspect of the present disclosure, an access and mobility management function (AMF) entity in a wireless communication system includes a transceiver configured to receive a first message requesting a location change notification for a terminal in an idle state from a session management function (SMF) entity; and a controller configured to control the transceiver to transmit a second message including information on a changed location of the terminal to the SMF entity based on the first message if the location change of the terminal is detected, wherein the second message is used to determine whether to maintain at least one of a plurality of user plane functions (UPFs) included in a protocol data unit (PDU) session for the terminal by the SMF entity.

According to the aspect of the present disclosure, the terminal (UE) can optimize a non-access stratum (NAS) signaling message, and can perform data transmission/reception with low latency. Further, if the MT or MO traffic occurs in a state where the terminal is in the CM-IDLE state, rapid data transmission becomes possible with respect to the PDU session in which the UP connection has already been set up.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 is a diagram illustrating information managed by an AMF for each PDU session of a terminal according to an embodiment;

DETAILED DESCRIPTION

Figure 1:
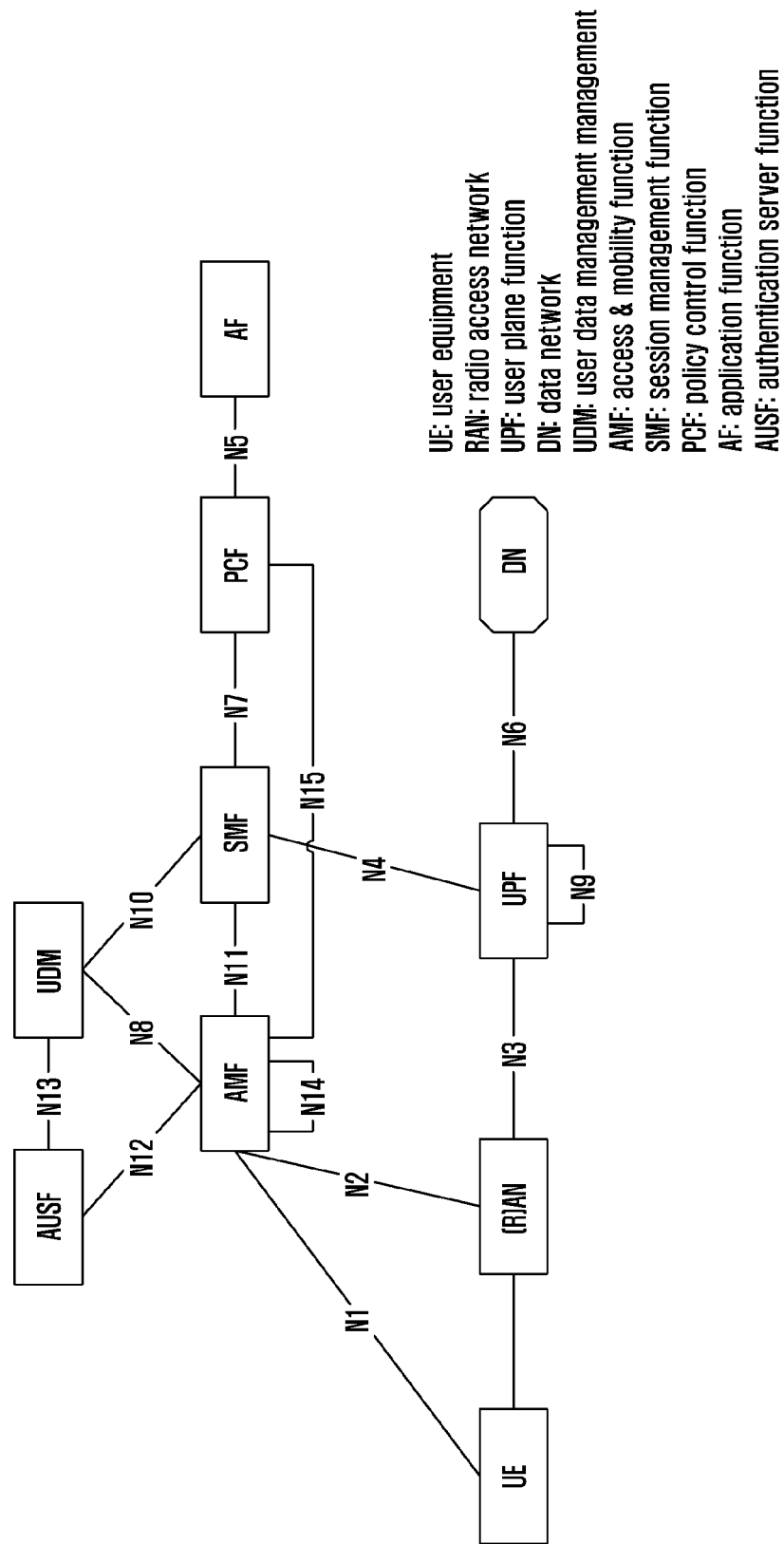
FIG. 1 is a diagram illustrating a network structure of a 5G system and an interface.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device Hereinafter, embodiments of the present disclosure will be described in detail with reference to the accompanying drawings. In describing the present disclosure, a detailed description of related known functions or configurations will be omitted if it is determined that it obscures the disclosure in unnecessary detail. Further, all terms used in the description are general terms that are widely used in consideration of their functions in the present disclosure, but may differ depending on intentions of a person skilled in the art to which the present disclosure belongs, customs, or appearance of new technology. Accordingly, they should be defined based on the contents of the whole description of the present disclosure.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

Hereinafter, embodiments of the present disclosure will be described in detail with reference to the accompanying drawings. In describing the present disclosure, a detailed description of related known functions or configurations will be omitted if it is determined that it obscures the disclosure in unnecessary detail. Further, all terms used in the description are general terms that are widely used in consideration of their functions in the present disclosure, but may differ depending on intentions of a person skilled in the art to which the present disclosure belongs, customs, or appearance of new technology. Accordingly, they should be defined based on the contents of the whole description of the present disclosure.

Hereinafter, a base station is a subject that performs resource allocation to a terminal, and may be at least one of an eNode B, Node B, base station (BS), radio access network (RAN), access network (AN), radio connection unit, base station controller, and node on a network. A terminal may include user equipment (UE), mobile station (MS), cellular phone, smart phone, computer, or multimedia system capable of performing a communication function. In the present disclosure, a downlink (DL) is a radio transmission path of a signal that is transmitted from the base station to the terminal, and an uplink (UL) means a radio transmission path of a signal that is transmitted from the terminal to the base station.

Although embodiments of the present disclosure will be described hereinafter as being exemplified through an LTE or LTE-A system, they can also be applied to other communication systems having similar technical backgrounds or channel types. Further, the embodiments of the present disclosure may also be applied to other communication systems through partial modifications thereof in a range that does not greatly deviate from the scope of the present disclosure through the judgment of those skilled in the art.

The present disclosure provides a scheme for determining whether to make an UP connection of a PDU session in accordance with a NAS signaling connection state (defined as CM-IDLE or CM-CONNECTED state) between a terminal and an AMF by defining an attribute of the PDU session used as a data transmission path in a cellular network. Further, the present disclosure provides a scheme for determining whether to maintain or release an N9 tunnel between a terminal and a UPF when the terminal in a CM-IDLE state moves if a plurality of user plane functions (UPFs) are included in a specific PDU session.

Specifically, an indication for synchronization/asynchronization with the NAS signaling connection may be introduced as an attribute of the PDU session. The indication may be determined by an SMF in a PDU session establishment procedure. In the establishment procedure, the AMF stores association between a PDU session ID and a serving SMF ID together with an indication for synchronization/asynchronization with the NAS signaling connection for each PDU session.

For example, if the indication of a specific PDU session is ON (or exists), a procedure of setting up the UP connection of the PDU session may be accompanied when the NAS signaling connection is set up (enters into a CM-CONNECTED state). On the other hand, if the indication of the specific PDU session is OFF (or does not exist), the procedure of setting up the UP connection of the PDU session may not be accompanied even if the NAS signaling connection is set up. In this case, the UP connection of the PDU session is set up only in case where the traffic using the PDU session occurs.

When the PDU session establishment is completed, and a PDU session establishment accept message is transferred to the terminal, the indication determined by the SMF can be sent together, and this may be used when the terminal generates a service request message later.

The indication for synchronization/asynchronization with the NAS signaling connection may be determined in the following method. First, the indication may be stored in a user data management (UDM) managing subscription data of the UE, and the SMF may acquire the indication from the UDM in the PDU session establishment procedure. Second, the indication may be transferred to the SMF and the UE in a terminal policy including information on the indication in the PDU session establishment procedure or subsequently from a policy control function (PCF) taking charge of the policy. Third, the UE may directly specify the indication when it sends a PDU session establishment request message for the PDU session establishment procedure. In this case, the SMF may finally determine the indication, and may transfer the information on the determined indication to the AMF and the UE.

Thereafter, if the terminal does not perform data transmission/reception over a predetermined time, an N2 release procedure for releasing the NAS signaling connection is performed by the RAN or the AMF. By performing a service request procedure by the network or the terminal with respect to the terminal that has entered into the CM-IDLE state, the terminal may be shifted from the CM-IDLE state to the CM-CONNECTED state.

In this case, with respect to the PDU session in which the indication for synchronization/asynchronization with the NAS signaling connection is ON, the terminal may transmit the service request message in which the PDU session ID is not included through the NAS signaling. The AMF having received the service request message may perform a PDU session Activation procedure with respect to the session in which the indication is ON based on the indication information stored together with the association between the PDU session ID managed by the AMF itself and the serving SMF ID. For the PDU session activation procedure, the AMF may send a request message for setting up the UP connection of the session to the SMF managing the PDU session together with the PDU session ID.

Even in case where the service request procedure by the network is performed with respect to the terminal in the CM-IDLE state, a similar operation may be performed. In this case, the AMF transmits paging through all RANs belonging to a location unit for tracking the terminal (e.g., tracking area list), and in response to this, the terminal having received the paging sends a paging response. If the paging response is received, in the same manner as described above, the AMF may perform the PDU session activation procedure with respect to the session in which the indication is ON based on the indication information stored together with the association between the PDU session ID managed by the AMF itself and the serving SMF ID.

If it is determined that the terminal is in a non-allowed area in which a service related to the session is not allowed before the AMF transmits to the SMF signaling for the PDU session Activation procedure with respect to the PDU session in which the indication for synchronization/asynchronization with the NAS signaling connection is ON, the PDU session activation procedure may not be performed.

If data transmission/reception does not occur over the predetermined time with respect to the terminal that is in the CM-CONNECTED state, the RAN or the AMF may perform an N2 release procedure for releasing the NAS signaling connection. In this case, the AMF may perform a PDU session deactivation procedure with respect to all SMF managing the PDU session for the purpose of releasing the UP connection with respect to all the PDU sessions in which the indication is ON.

In addition, a case where an independent session deactivation procedure is supported for each PDU session with respect to the terminal that is in the CM-CONNECTED state may be considered. The deactivation procedure of releasing the UP connection for each session may be performed by the RAN, AMF, SMF, or an anchor UPF.

First, in case where the AMF triggers deactivation, it may operate not to request the PDU session deactivation from the SMF with respect to the session in which the indication for synchronization/asynchronization with the NAS signaling connection of the PDU session ID managed by the AMF is ON. Next, in case where the SMF triggers deactivation, it may not directly perform the PDU session deactivation procedure since the SMF can identify the indication for synchronization/asynchronization with the NAS signaling connection for each session. Even in case where the RAN or the UPF performs triggering, it is possible to prevent independent session deactivation for the session in which the indication for synchronization/asynchronization with the NAS signaling connection is ON by making the SMF not perform the PDU session deactivation procedure.

Specifically, in case where a plurality of UPFs participate in a specific PDU session of the terminal, the UP connection between the terminal and the anchor UPF taking charge of connection with an external data network (DN) may be composed of data radio bearer (DRB) between the UE and the RAN, N3 tunnel between the RAN and the UPF that is an end-point of an N3 tunnel, and an N9 tunnel between the UPF that is an end-point of the N3 tunnel and the anchor UPF that is an end-point of an N6 interface.

Figure 2:
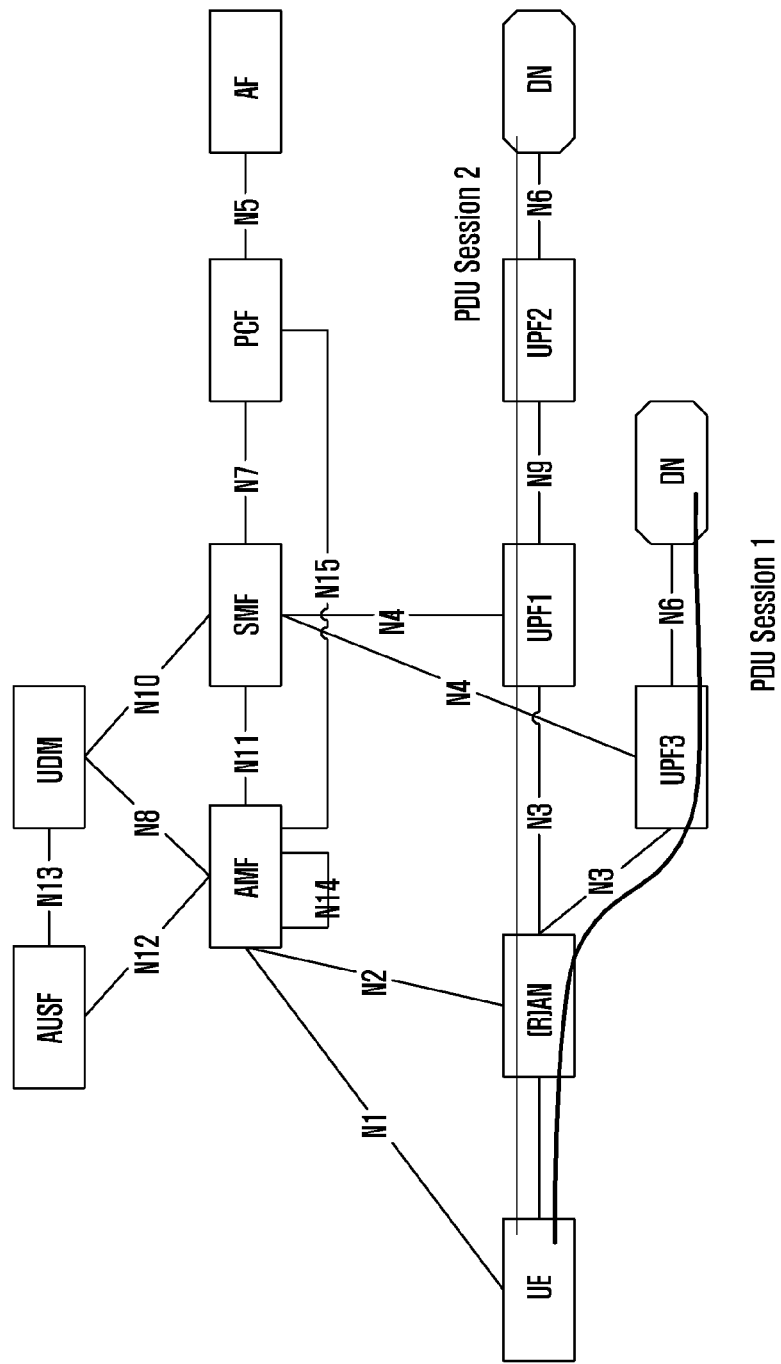
FIG. 2 is a diagram illustrating a network structure in case where a terminal sets up a plurality of PDU sessions including a PDU session composed of a plurality of UPFs through a 5G network.

FIG. 2 illustrates a case where the terminal sets up two PDU sessions. The UP connection of the session is composed of the DRB and the N3 tunnel since PDU session 1 is set up through one UPF (UPF3), whereas the UP connection of the session is composed of the DRB, the N3 tunnel, and the N9 tunnel since PDU session 2 is set up through two UPFs (UPF1 and UPF2).

When releasing only the UP connection of the PDU session in case where the terminal is shifted from the CM-CONNECTED state to the CM-IDLE state or the terminal supports an independent session deactivation procedure with respect to a PDU session in which the UP connection is set up through a plurality of UPFs like the PDU session 2, the terminal may release the DRB and the N3 tunnel, but may maintain the N9 tunnel between the UPFs without removing the same. This is because MO/MT traffics to occur later can be rapidly transmitted and received through the corresponding PDU session.

In performing a PDU session establishment procedure including a plurality of UPFs, the SMF may request to receive a notification on a UE location change from the AMF. The request may be implemented through a method for subscribing the corresponding service in case where the SMF transfers an indication for the notification to the AMF or the AMF provides a service, such as a UE location notification.

The UE location information may be reported not only in a cell or base station ID but also in the unit of an area that can be identified in a core network in order to grasp the location of the terminal, such as a tracking area (TA). With respect to the requested session, the AMF reports the same when the UE location is changed.

The SMF having received the notification for the UE location perform a procedure for identifying whether the UE location is included in the service area of the UPF that is an end-point of the N3 tunnel, and if it is determined that the UE location is still included in the service area of the UPF, the SMF maintains the N9 tunnel between the UPF and the anchor UPF of the PDU session. If the SMF does not directly manage the service area of the UPF, it may identify whether the UE location belongs to the service area through a query to the UPF. If it is determined that the UE location is not included in the service area of the UPF, the SMF may release the N9 tunnel. In this case, the SMF may newly set up the N9 tunnel with the anchor UPF by newly selecting the end-point UPF of the N3 tunnel that is optimum to the UE location.

In addition, a management scheme related to the maintenance/release and change of the N9 tunnel may be performed not only based on the UE location information but also on other conditions. As an example, the PDU session may be allocated with a QoS profile (or parameter) including a QoS requirements from the 5GC, and if the QoS profile is changed, the SMF may release the N9 tunnel or may newly configure the N9 tunnel by setting up another new intermediate UPF (I-UPF).

The change of the QoS profile may include a notification from the RAN or a change of the QoS profile of the corresponding session through the UDM or the PCF. The QoS profile may have per session aggregate maximum bit rate (session-AMBR) and per UE aggregate maximum bit rate (UE-AMBR) for each PDU session, and in case of a guaranteed bit rate (GBR) QoS flow, the QoS profile may include a guaranteed bit rate (GFBR) and a maximum flow bit rate (MFBR). Further, in case of the 5GC, a 5G QoS indication (5AI) may be configured to include a resource type (GBR or non-GBR), a priority level, a packet delay budget, and a packet error rate, and may mean the change of such values. The change of the QoS profile may be performed through a PDU session modification procedure.

In addition, the management scheme related to the maintenance/release and change of the N9 tunnel may be performed through reception of an input of a dynamic load state of the UPF constituting the N9 tunnel. In particular, in case where the SMF monitors the load state of the UPFs managed by the SMF itself, if the load of the intermediate UPF rather than the anchor UPF exceeds a specific threshold, the N9 tunnel of the PDU session using the intermediate UPF as a transmission path may be released, or the N9 tunnel may be newly configured by changing the intermediate UPF to a new intermediate UPF having low congestion (i.e., having a load that is smaller than a threshold value). The dynamic load state of the UPF may be determined by the amount of data traffic passing through the corresponding UPF, the number of PDU sessions actually set up, and relative capacity between UPFs.

In addition, the management scheme related to the maintenance/release and change of the N9 tunnel may be performed based on capability or functionality of the UPF used in a specific session of the terminal. As an example, the functionality/capability of the UPF to satisfy the requirements, such as data network name (DNN) used during the session setup of the terminal, access point name (APN), network slice selection assistance information (NSSAI), UE usage type, service and session continuity (SSC) mode, and service type. Through this, if it is determined that the intermediate UPF does not satisfy the functionality/capability, the SMF may maintain only the anchor UPF of the corresponding PDU session by releasing the N9 tunnel, or may newly set up the N9 tunnel by selecting a new intermediate UPF satisfying the functionality/capability.

In addition, the management scheme related to the maintenance/release and change of the N9 tunnel may be performed through reception of an input of a UE mobility pattern. As an example, the AMF of the 5GC may directly calculate the mobility pattern of the UE, or may acquire the UE mobility pattern from a third party server. If it is determined that the UE mobility is large beyond a specific threshold value (e.g., if the number of times of handover occurring during a specific time exceeds a threshold value), the AMF may notify the SMF of the UE mobility information. Accordingly, the SMF may reduce a signaling load for N9 tunnel update by releasing the N9 tunnel with respect to the PDU session (in which the UP connection is deactivated) of the UE, or may reduce the number of times of N9 tunnel update by setting up the existing anchor UPF and a new N9 tunnel through selection of a new intermediate UPF having a wider service area.

The information on the UE mobility pattern may be used to determine whether to maintain or release the N9 tunnel between the intermediate UPF and the anchor UPF. Further, if the PDU session has a plurality of anchor UPFs, the N9 tunnel may mean the N9 tunnel between the intermediate UPF existing at the end of the N3 tunnel that is the next-hop of the base station and a branching point for branching the traffic to the plurality of anchor UPFs or the intermediate UPF serving as an uplink classifier.

Figure 3:
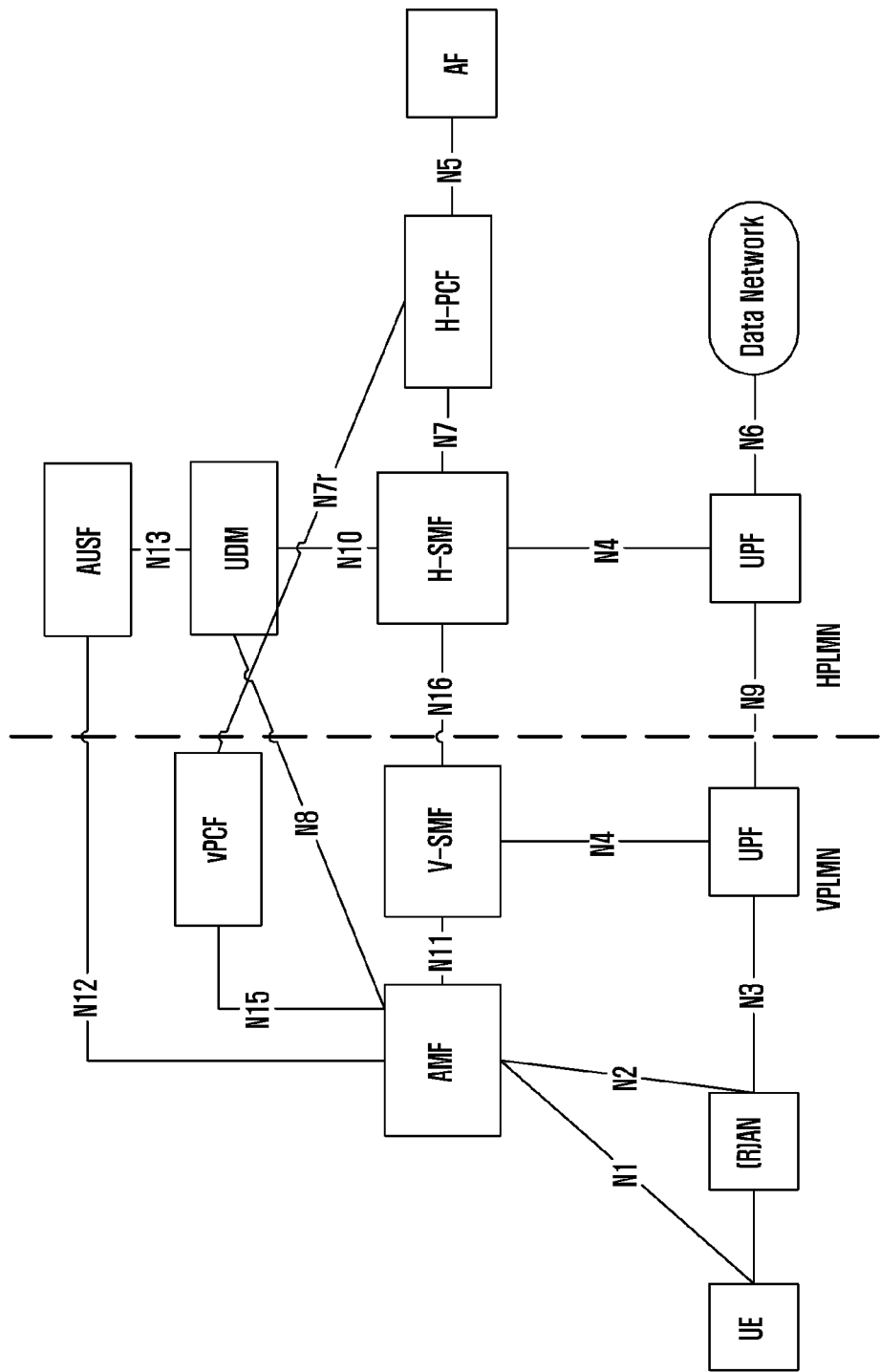
FIG. 3 is a diagram illustrating a network structure of a 5G system and an interface for providing a home-routed roaming service.

The PDU session in which the UP connection is set up through a plurality of UPFs may be considered in a roaming scenario. In case of home-routed roaming as shown in FIG. 3, the N9 tunnel exists between the UPF of a home PLMN (HPLMN) and the UPF of a visited PLMN (VPLMN), and the N9 tunnel is always maintained regardless of the NAS signaling connection state of the terminal and the deactivation state of the PDU session. In this case, under the assumption that local offloading is permitted in the VPLMN by the SMF of the HPLMN, another UPF may be additionally inserted between the RAN and the UPF, and with respect to the N9 tunnel between the UPFs in a VPLMN network, the N9 tunnel maintenance and release schemes proposed according to the present disclosure may be applied through signaling between the AMF and the SMF of the VPLMN.

Figure 4:
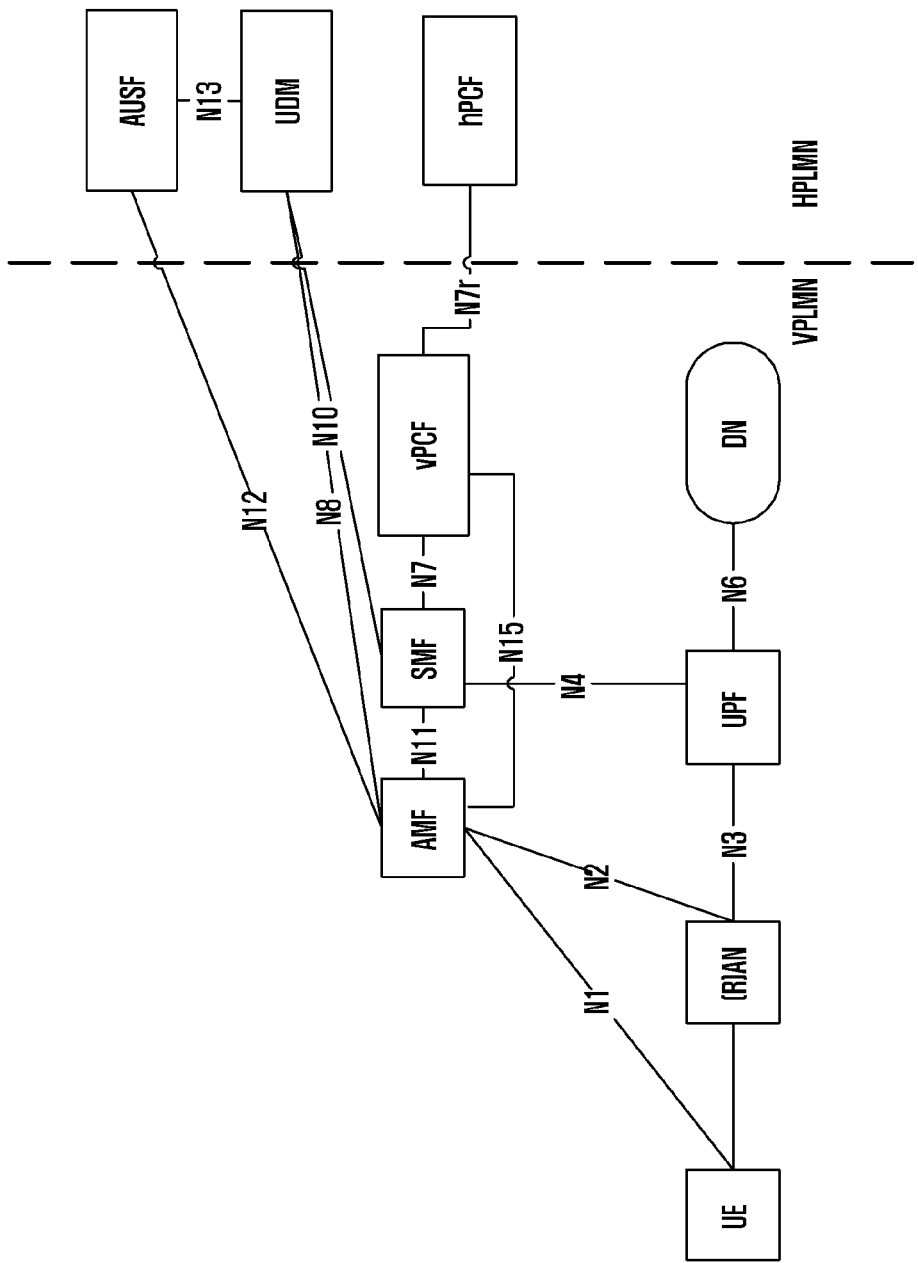
FIG. 4 is a diagram illustrating a network structure of a 5G system and an interface for providing a local breakout roaming service.

Further, in case of local breakout roaming that is another roaming scenario, as shown in FIG. 4, the N9 tunnel maintenance and release scheme proposed according to the present disclosure may be applied with respect to the PDU session in which the N9 tunnel exists through signaling between the AMF and the SMF of the VVPLMN.

Hereinafter, the main operation according to the present disclosure will be described through detailed embodiments.

In an embodiment, association including an indication for synchronization/asynchronization with a PDU session ID, serving SMF ID, and NAS signaling connection managed by an AMF in case where a terminal sets up a plurality of PDU sessions will be described.

Figure 5:
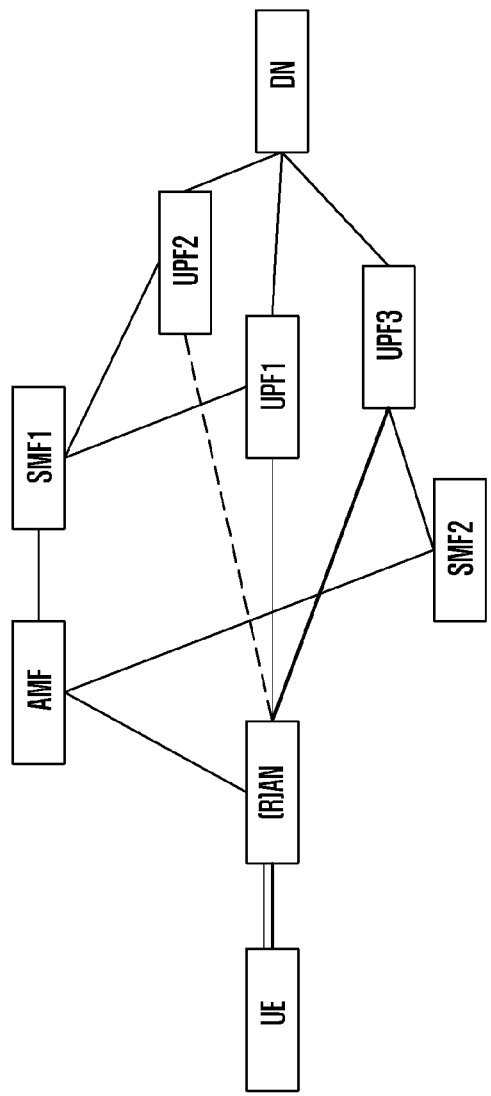
FIG. 5 is a diagram illustrating a network structure in case where a terminal sets up three PDU sessions according to an embodiment.

FIG. 5 shows a case where a terminal sets up three PDU sessions with the same DN, and each PDU session configures an UP connection through different UPFs. In particular, if the PDU session including UPF1 is called number 1, the PDU session including UPF2 is called number 2, and the PDU session including UPF3 is called number 3, PDU sessions 1 and 2 are managed by SMF1, PDU session 3 is managed by SMF2, and the terminal is registered in a network by an AMF to perform mobility management.

Referring to FIG. 6, information on the PDU sessions managed by the AMF are included for a scenario of FIG. 5. A PDU session ID, a serving SMF, a PDU session status indicating activation/deactivation status of the current UP connection, and an indication for synchronization/asynchronization with a NAS signaling connection proposed according to the present disclosure are indicated for each PDU session. FIG. 6 shows an example in which PDU session 1 is synchronized with the NAS signaling connection. Accordingly, if the NAS signaling connection is set up in PDU session 1, the UP connection of the PDU session can be set up from the AMF to the SMF even if the terminal does not request the same.

Figure 7:
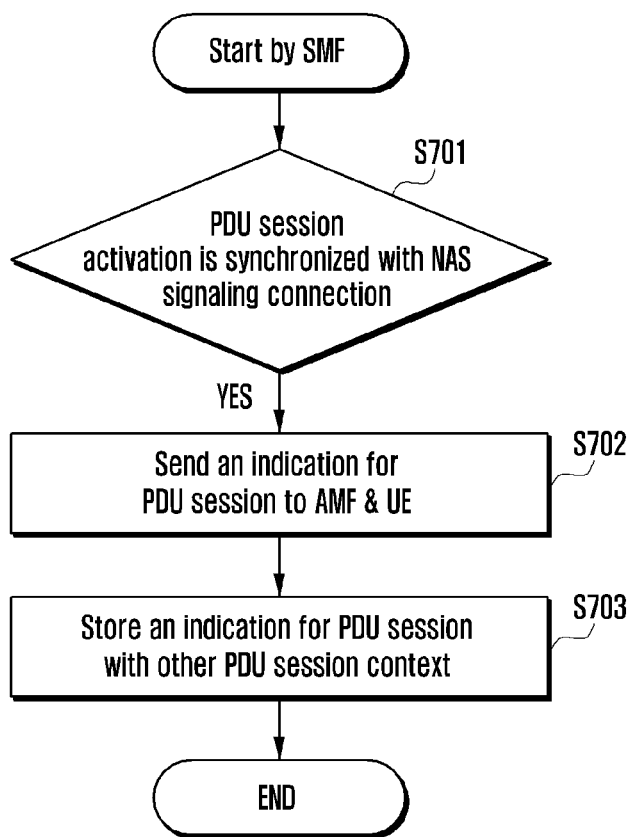
FIG. 7 is a diagram illustrating an operation of an SMF related to an indication for synchronization/asynchronization with a NAS signaling connection for each PDU session according to an embodiment.

Through an embodiment, the operation of each network entity related to an indication for synchronization/asynchronization with a NAS signaling connection will be described. Referring to FIG. 7, an SMF may determine an indication for synchronization/asynchronization with the NAS signaling connection for each PDU session (S701), and if the synchronization is determined, it becomes possible to transfer to an AMF and SMF the indication for synchronization/asynchronization with the NAS signaling connection can be transferred together with a PDU session ID capable of identifying a PDU session (S702). Further, the SMF may store the indication for synchronization/asynchronization with the NAS signaling connection in a PDU session context managed by the SMF itself (S703).

Figure 8:
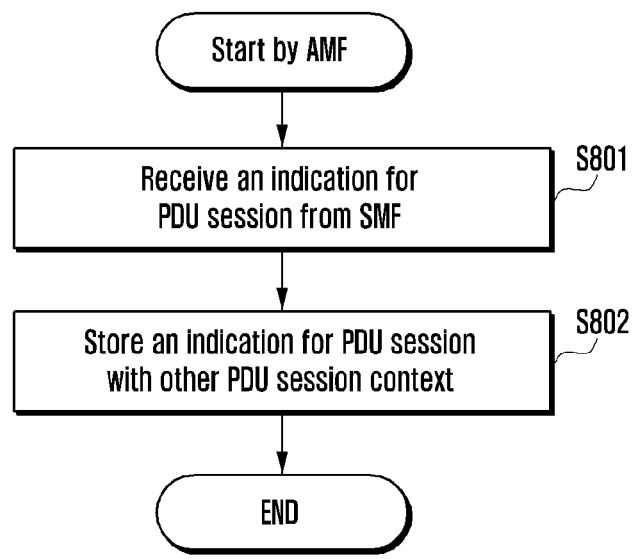
FIG. 8 is a diagram illustrating an operation of an AMF related to an indication for synchronization/asynchronization with a NAS signaling connection for each PDU session according to an embodiment.

FIG. 8 shows an operation of an AMF related to an indication for synchronization/asynchronization with the NAS signaling connection. If the AMF receives the indication for synchronization/asynchronization with the NAS signaling connection together with a PDU session ID (S801), it may store the indication in a context related to the PDU session managed by the AMF itself (S802).

Figure 9:
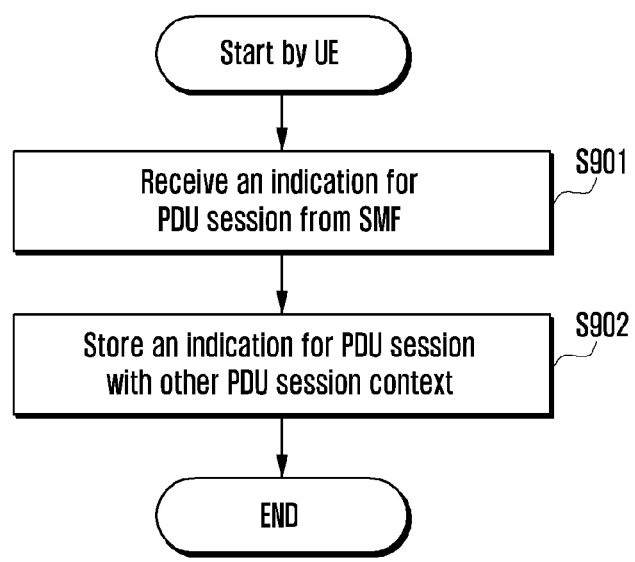
FIG. 9 is a diagram illustrating an operation of a terminal (UE) related to an indication for synchronization/asynchronization with a NAS signaling connection for each PDU session according to an embodiment.

FIG. 9 illustrates a UE operation related to an indication for synchronization/asynchronization with a NAS signaling connection. If UE receives an indication for synchronization/asynchronization with a NAS signaling connection together with a PDU session ID in a similar manner to the AMF (S901), it may store the indication in a context related to the PDU session managed by the AMF itself (S902).

Figure 10:
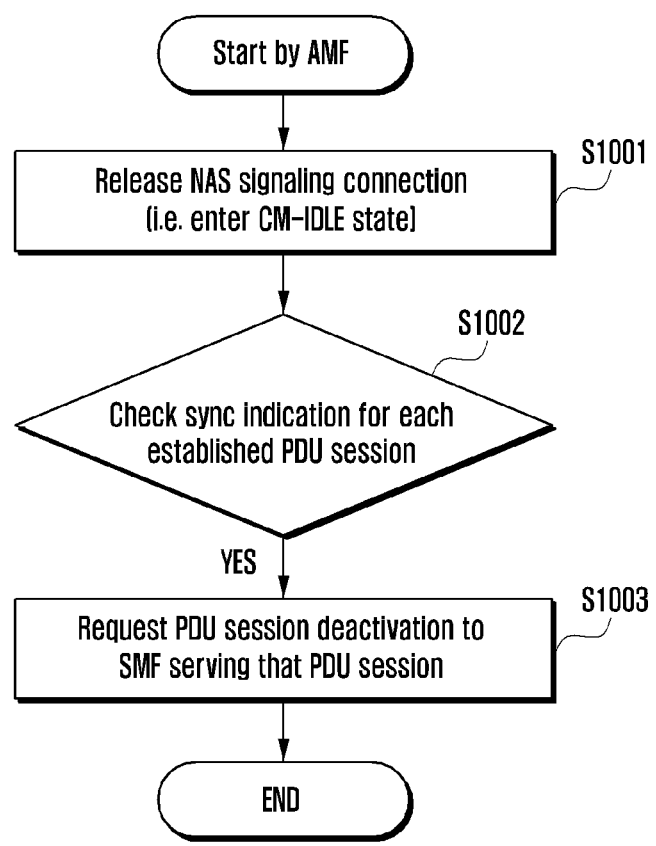
FIG. 10 is a diagram illustrating an operation of an AMF related to an indication for synchronization/asynchronization with a NAS signaling connection when the NAS signaling connection between a terminal and the AMF is released according to an embodiment.

In an embodiment, when a NAS signaling connection state between a terminal and an AMF is changed, an AMF operation related to an indication for synchronization/asynchronization with a NAS signaling connection is illustrated. Referring to FIG. 10, if the NAS signaling connection state is shifted from a CM-CONNECTED state to a CM-IDLE state (S1001), the AMF identifies an indication for synchronization/asynchronization with the NAS signaling connection for each PDU session managed by the AMF itself with respect to the terminal (S1002), and if the indication exists, it may request an SMF that manages the PDU session to perform a PDU session deactivation procedure (S1003).

Figure 11:
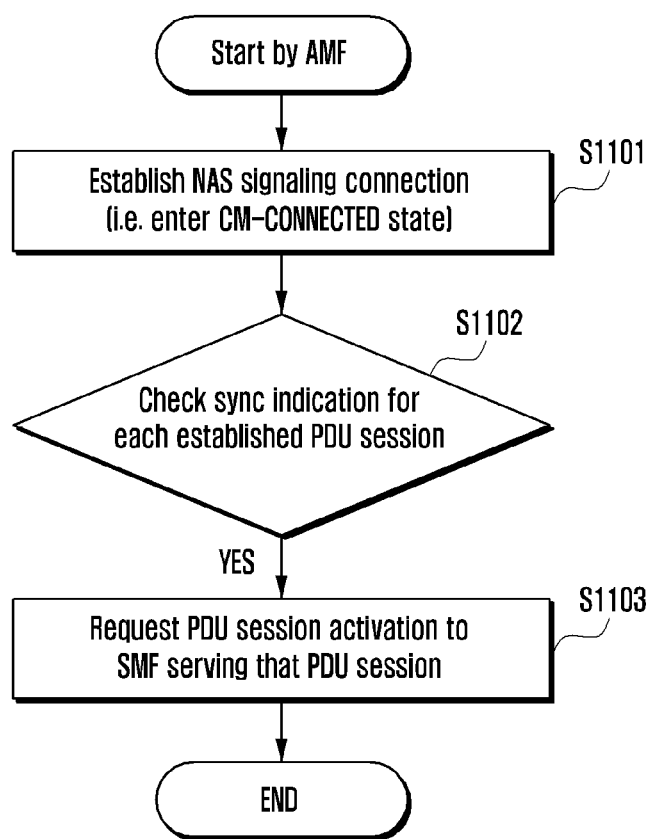
FIG. 11 is a diagram illustrating an operation of an AMF related to an indication for synchronization/asynchronization with a NAS signaling connection when the NAS signaling connection between a terminal and the AMF is set up according to an embodiment.

Referring to FIG. 11, if the NAS signaling connection state is shifted from the CM-IDLE state to the CM-CON- NECTION state (S1101), the AMF identifies an indication for synchronization/asynchronization with the NAS signaling connection for each PDU session managed by the AMF itself with respect to the terminal (S1102), and if the indication exists, it may request the SMF that manages the PDU session to perform a PDU session activation procedure (S1103).

In an embodiment, the operation of UE related to an indication for synchronization/asynchronization with a NAS signaling connection will be described. In order for a terminal that is in a CM-IDLE state to be shifted to a CM-CONNECTED state, it may perform a service request procedure. The terminal may generate a service request message by determining whether to include a PDU session ID in accordance with an indication for synchronization/asynchronization with the NAS signaling connection with respect to a PDU session already set up by the terminal itself.

Figure 12:
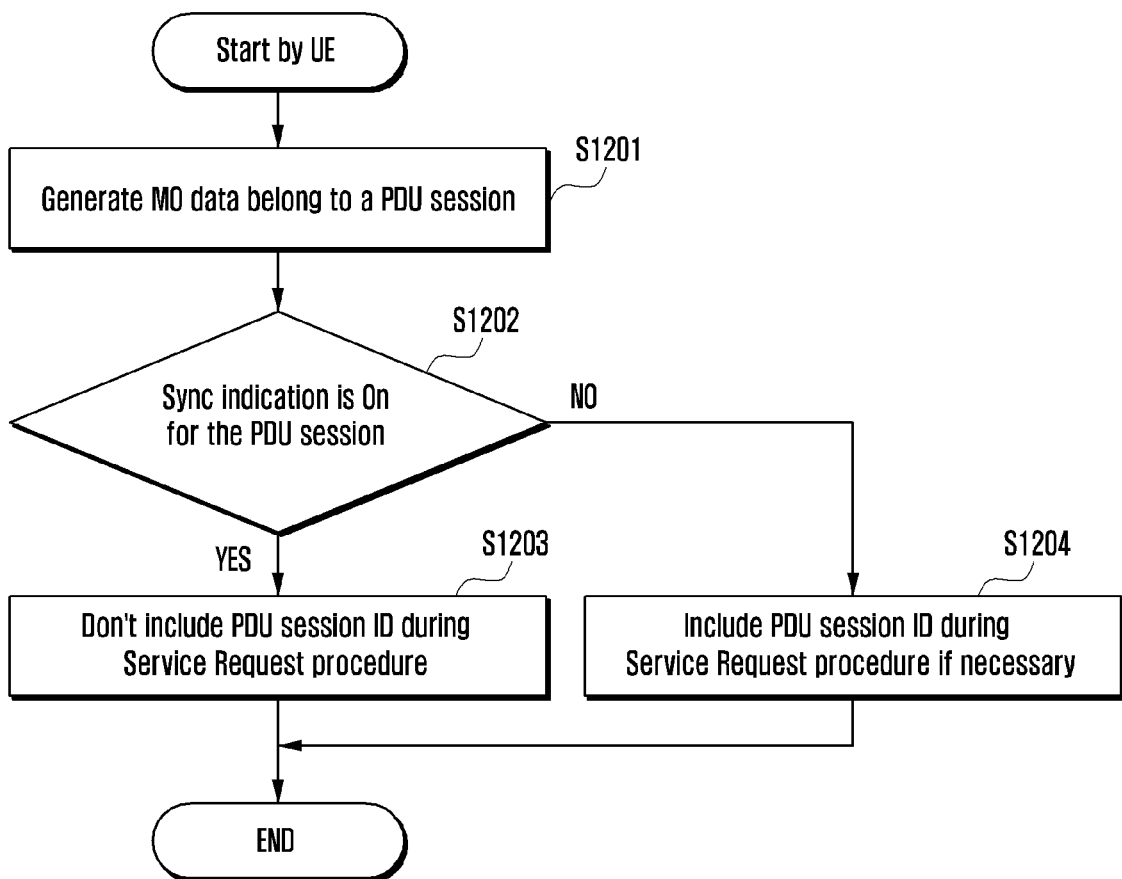
FIG. 12 is a diagram illustrating an operation of a terminal in a CM-IDLE state related to an indication for synchronization/asynchronization with a NAS signaling connection according to an embodiment.

Referring to FIG. 12, if MO data of a specific PDU session occurs (S1201), the terminal identifies the indication for synchronization/asynchronization with the NAS signaling connection for the corresponding PDU session, and if the indication exists (S1202), it may not include a PDU session ID in a service request message (S1203). If the indication does not exist, the terminal may determine whether an UP connection of the corresponding PDU session is necessary in the service request message, and if it is determined that the UP connection is necessary, it may include the PDU session ID in the service request message (S1204). The service request message may be transferred to the AMF through NAS signaling.

In an embodiment, if a plurality of UPFs participate in a process in which a terminal sets up a PDU session, an operation performed by an SMF will be described. If the SMF determines that a plurality of UPFs are necessary for an UP connection of a PDU session in a PDU session establishment process, the SMF configures an N9 tunnel between the UPFs.

Figure 13:
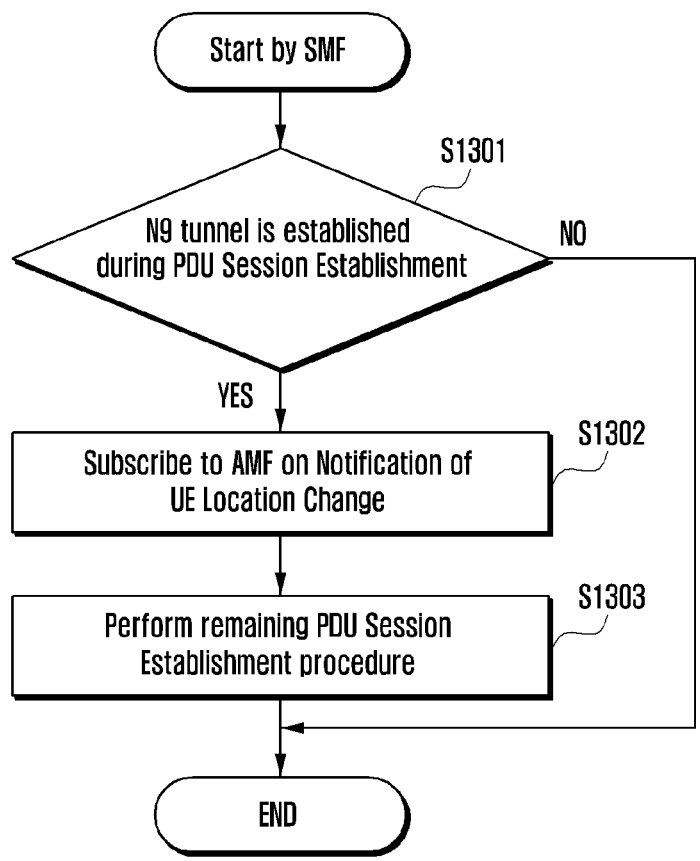
FIG. 13 is a diagram illustrating an operation performed by an SMF in case where a plurality of UPFs participate in a process in which a terminal sets up a PDU session according to an embodiment.

Referring to FIG. 13, when configuring the N9 tunnel (S1301), the SMF may request to receive a notification on a UE location change from the AMF during the PDU session establishment process or after completion of the process (S1302). If a PDU session setup process remains, the SMF may perform the remaining procedure (S1303). Thereafter, if the terminal enters into a CM-IDLE state, location information of the terminal may be managed by the AMF.

Figure 14:
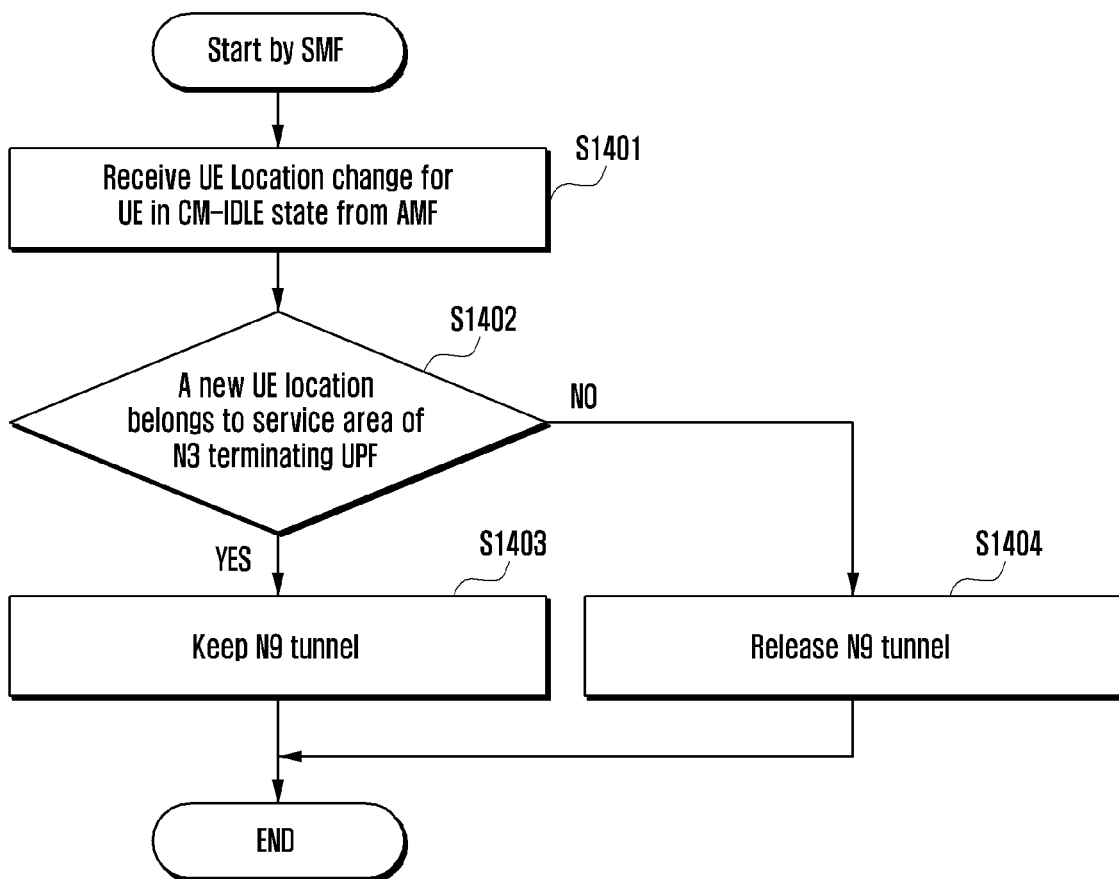
FIG. 14 is a diagram illustrating an operation of an SMF in case where a terminal in a CM-IDLE state receives a notification on location information of the terminal from an AMF according to an embodiment.

FIG. 14 illustrates an operation of an SMF in case where a terminal in a CM-IDLE state receives a notification on location information of the terminal from an AMF. If the SMF receives the notification on the location of the terminal from the AMF (S1401), it determines through comparison whether the terminal location is included in a service area of an UPF that is an end-point of an N3 tunnel (S1402), and if the terminal location is included in the service area, it may maintain the N9 tunnel (S1403). However, if it is determined that the terminal location deviates from the service area of the UPF that is an end-point of the N3 tunnel, the SMF may release the N9 tunnel (S1404).

Figure 15:
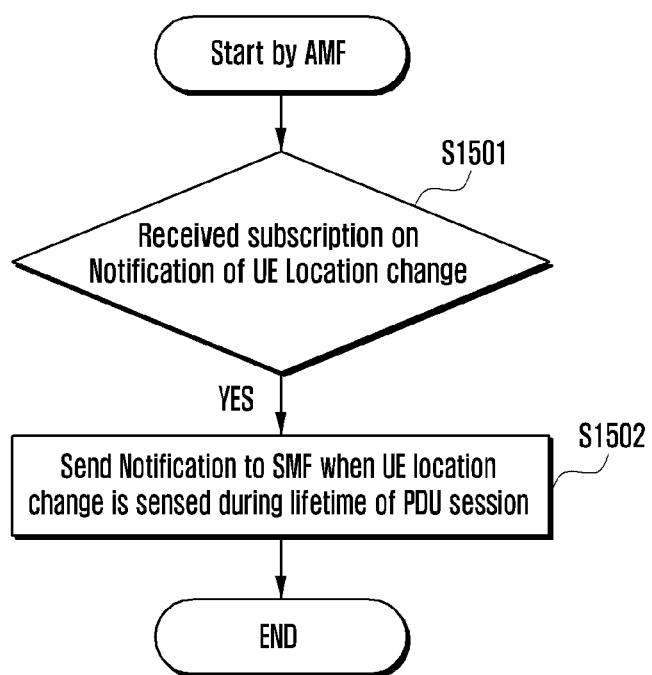
FIG. 15 is a diagram illustrating an operation of an AMF in case where the AMF receives a notification on UE location change from an SMF according to an embodiment.
Figure 16:
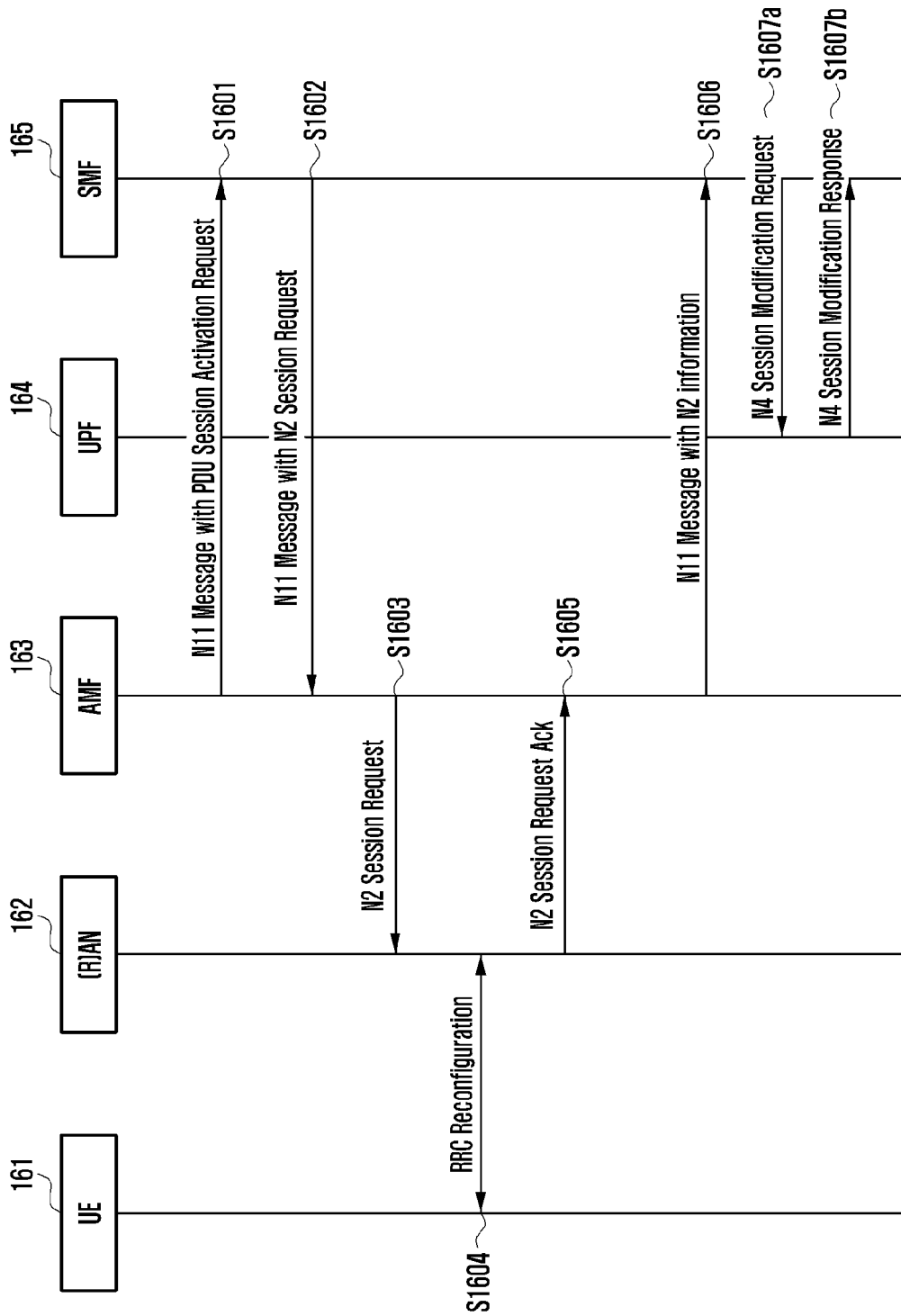
FIG. 16 is a diagram illustrating an operation of an SMF in case where the SMF receives a PDU session activation request from an AMF according to an embodiment.

FIG. 15 illustrates an operation of an AMF in case where the AMF receives a notification on UE location change from an SMF (S1501). The AMF may transmit a notification message including information on a location of new UE to the SMF having requested the notification on the UE location change whenever the UE location change occurs before the subsequent corresponding session is released.

In an embodiment, a detailed procedure in which an AMF requests a PDU session activation from an SMF if an indication for synchronization/asynchronization with a NAS signaling connection exists with respect to the PDU session of a terminal will be described. Each procedure illustrated in FIG. 16 may be explained by the description in Table 1 below.

TABLE 1

1. The AMF sends PDU session activation request including PDU session ID to the SMF associated with the PDU session via N11 message.
2. The SMF sends N11 message to the AMF by containing N2 session request. The N11 message also contains the CN tunnel information allocated by the UPF serving the PDU session and QoS information associated with the PDU session.
3. The AMF sends N2 session request to the (R)AN including CN tunnel information and QoS information received from the SMF.
4. The (R)AN performs RRC Connection Reconfiguration with the UE to establish (R)AN resources depending on the QoS information for the PDU session to be activated. The (R)AN also allocates (R)AN tunnel information for the PDU session. Now, the uplink data from the UE can be delivered to the UPF via the (R)AN.
5. The (R)AN sends N2 session request ack to the AMF including (R)AN tunnel information of the activated PDU session.
6. The AMF forwards the N2 SM information received from the (R)AN to the SMF via N11 message.
7a. The SMF provides N4 session modification request to the UPF by including (R)AN tunnel information received from the (R)AN.
7b. The UPF provides N4 session modification response to the SMF.

More specifically, the AMF 163 generates and transfers a PDU session activation signaling for setup of an UP connection of a PDU session to the SMF 165 managing the corresponding PDU session through inclusion of a PDU session ID in the PDU session in which the indication exists (S1601). If the PDU session activation signaling is received, the SMF 165 performs a procedure for setup of the UP connection of the corresponding PDU session. The SMF 165 may send a message including N3 tunnel related information already set up in an anchor UPF 164 and QoS related information (QoS profile) of the corresponding session to a (R)AN 162 through the AMF 163 (S1602 and S1603). The (R)AN having received the message for the setup of the UP connection of the PDU session may allocate a necessary base station resource by performing an operation including RRC connection reconfiguration together with the UE 161 (S1604).

The N3 tunnel related information generated by the (R)AN 162 may be transferred again to the SMF 165 through the AMF 163 (S1605 and S1606). Then, the SMF 165 may transmit a session modification message including the N3 tunnel related information received from the (R)AN 162 to complete the N3 tunnel setup to an anchor UPF 164 of the corresponding session (S1607a and S1607b).

Figure 17:
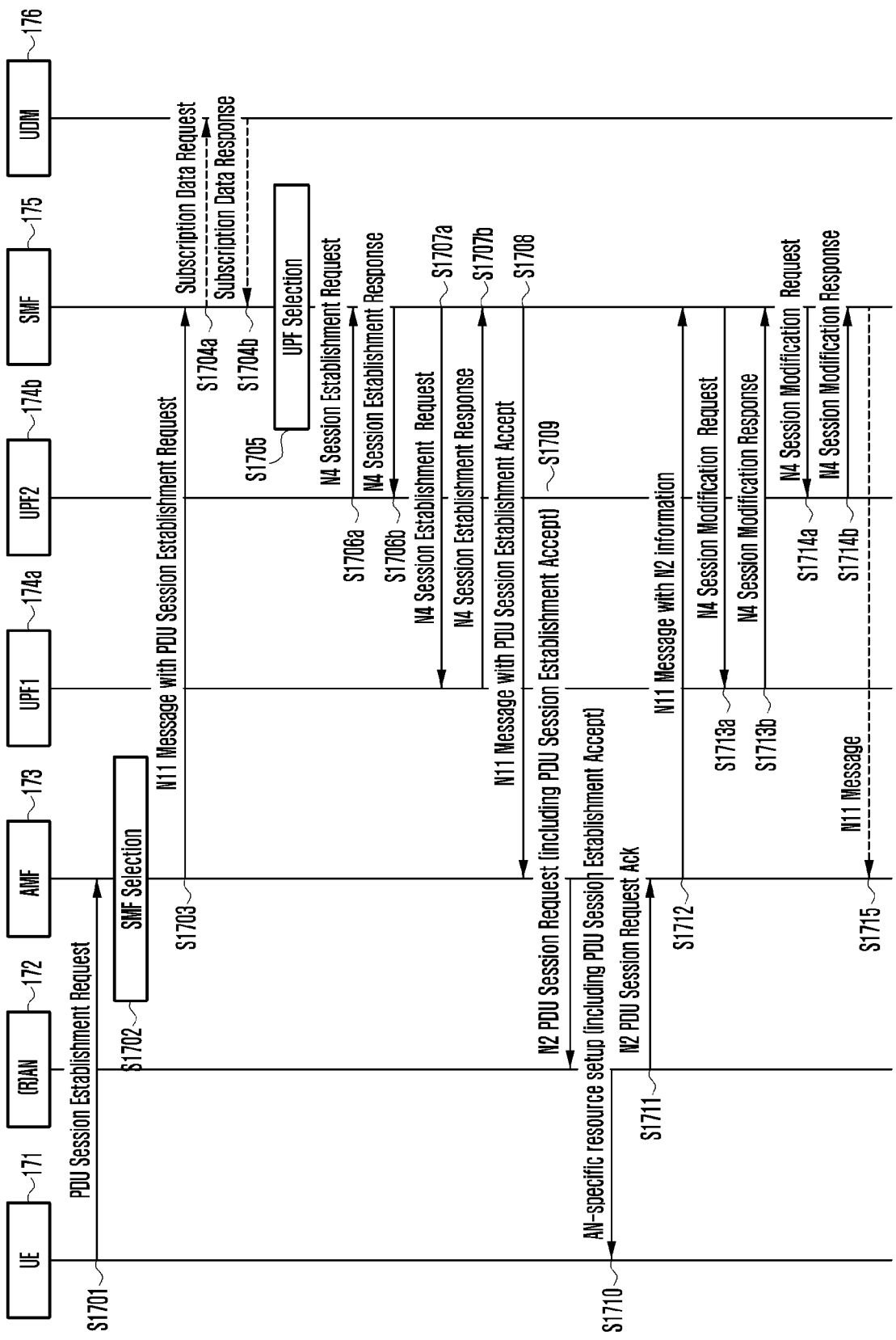
FIG. 17 is a diagram illustrating a case where a plurality of UPFs are included in a PDU session establishment procedure by a terminal according to an embodiment.

In an embodiment, a case where a plurality of UPFs are included in a PDU session establishment procedure by a terminal will be described. As shown in FIG. 17, operation S1701 includes a process in which UE 171 generates and transfers a new PDU session ID to an AMF 173 through NAS signaling in order to start a PDU session establishment. At operation S1702, the AMF 173 identifies that the PDU session ID is new from the received NAS message, and selects an SMF 175 for managing the corresponding session. At operation 1703, the AMF 173 forwards a NAS signaling message to the selected SMF 175. At operations S1704a and S1704b, the SMF 175 acquires subscription information from a user data management server (UDM) 176 in order to identify the subscription information for the session. This process may not be performed.

At operation S1705, the SMF 175 may select a plurality of anchor UPFs 174a and 174b through UPF selection. Operations S1706a, S1706B, S1707a, and S1707b include a process of setting up sessions with a plurality of UPFs newly selected. Operation S1708 illustrates a procedure in which an SMF 175 sends signaling for session setup to the AMF 173. This signaling may include a NAS message to the UE 171 and an N2 message to the (R)AN 172.

The NAS message may include a PDU session establishment accept and an IP address for session in case of an IPv4 session type, and the N2 message may include information on the N3 tunnel (e.g., tunneling ID) setup in the anchor UPF 174a at operation S1707a and S1707b.

Further, at operation S1708, if it is determined that the N9 tunnel setup is necessary, the SMF 175 may transmit an N11 message including an indication for requesting a notification on the UE location to the AMF 173. The AMF 173 having received the indication for the UE location notification may store this information in a session related context managed by the AMF itself.

At operation S1709, the AMF 173 transfers the N2 message and NAS message to the (R)AN 172, and the (R)AN 172 includes a process of setting up a tunnel of the anchor UPF 174a from the received N2 message. AT operation S1710, the (R)AN 172 includes a process of performing a DRB setup for the session with the UE 171 and transferring the NAS message to the UE 171. Through operation S1711, the (R)AN 172 includes a process of sending an ACK for signaling performed at operation S1709, including the N3 tunnel information set up by the (R)AN itself, to the AMF 173.

At operation S1712, the AMF 173 transfers the N3 tunnel information received from the (R)AN 172 to the SMF 175, and at operation S1713, the SMF 175 transfers the N3 tunnel information generated by the (R)AN 172 to UPF1 174a that is an end-point of the N3 tunnel. Through this, the N3 tunnel setup for data transmission is completed. Through operation S1714, an anchor UPF 174b acquires all tunnel related information for the N9 tunnel setup to complete the N9 tunnel setup.

When all the UP connections for the session are completed through an operation S1715, the signaling may be additionally sent to the AMF 173. If the SMF 175 does not request the notification on the UE location at previous operation, it may request the notification from the AMF 173 at this time. Thereafter, in case of an IPv6 PDU session type, the SMF 175 may generate a router advertisement message including an IP prefix information newly allocated, and may transfer the message to the UE 171 through UP signaling via the anchor UPF 174b.

Figure 18:
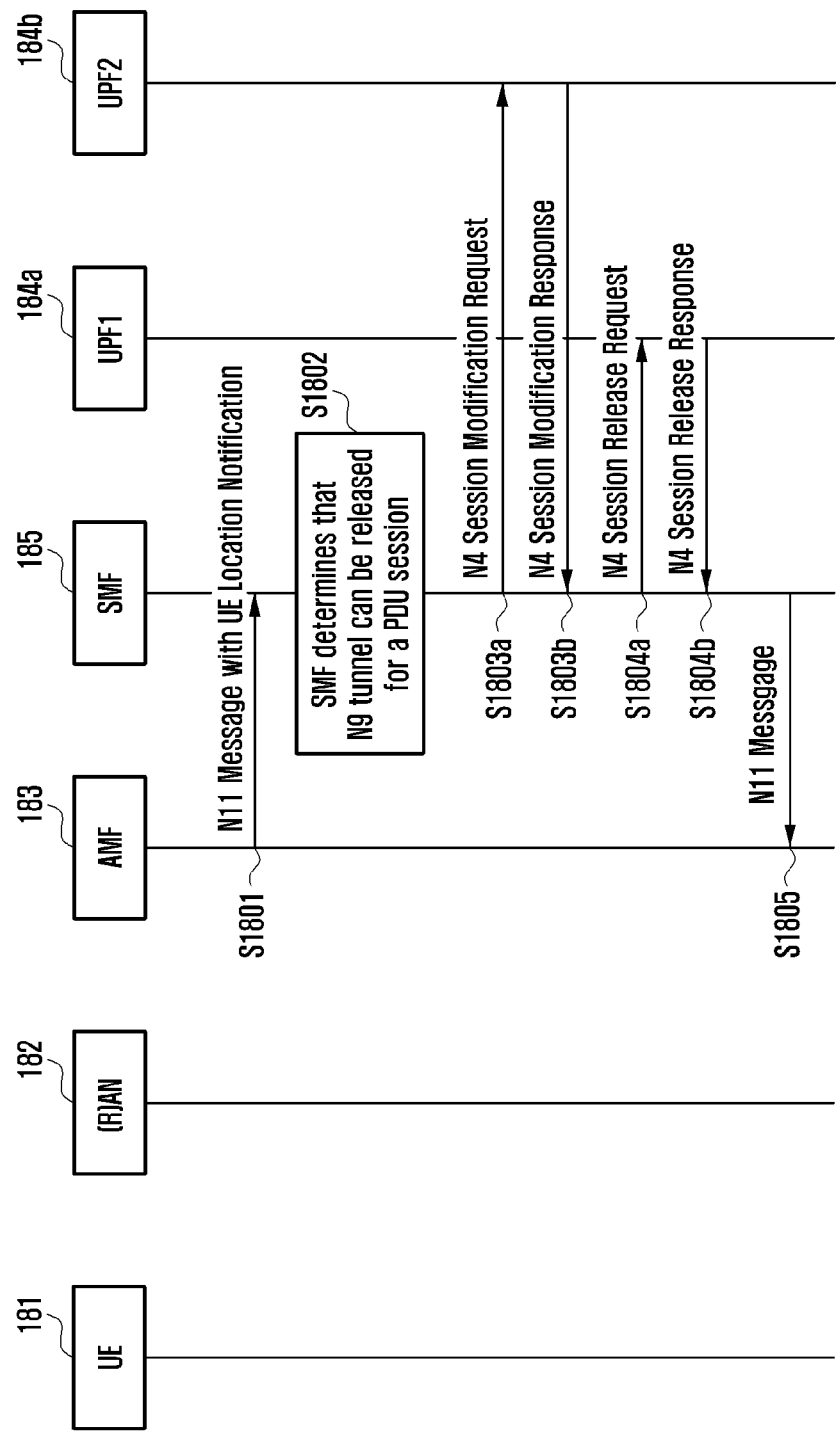
FIG. 18 is a diagram illustrating an operation for releasing an N9 tunnel with respect to a PDU session composed of a plurality of UPF s according to an embodiment.

In an embodiment, if a terminal in a CM-IDLE state moves, an N9 tunnel release operation with respect to a PDU session composed of a plurality of UPFs will be described. FIG. 18 illustrates a procedure related to this embodiment. Operation S1801 includes a process in which an AMF 183 transfers an N11 message to an SMF 185 that has requested the SMF 185 to notify of a UE location change. Operation S1802 includes a process of determining whether the UE belongs to a service area of UPF1 184a based on the UE location notified from the AMF 183, and a process of releasing an N9 tunnel previously set up if it is determined that the UE deviates from the service area of the UPF1 184a.

Through operations S1803a, S1803b, S1804a, and S1804b, the SMF 185 exchanges signaling for releasing the N9 tunnel with the UPF1 184a that is an end-point of the N3 tunnel and UPF2 184b that is an anchor UPF. In this case, for downlink data buffering, the SMF performs a session modification process with the anchor UPF 184b, and performs a session release process with the UPF1 184a that is an end-point of the N3 tunnel. In addition, if it is determined that the N9 tunnel setup is necessary in a new UE location, the SMF 185 may perform a procedure of selecting a UPF suitable to the new UE location and setting up the anchor UPF 184b and the new N9 tunnel. If the N9 tunnel for the PDU session is not newly set up, the SMF 185 may send an N11 message including a message for requesting not to receive a notification on the UE location change any more from the AMF 183 (S1805).

Figure 19:
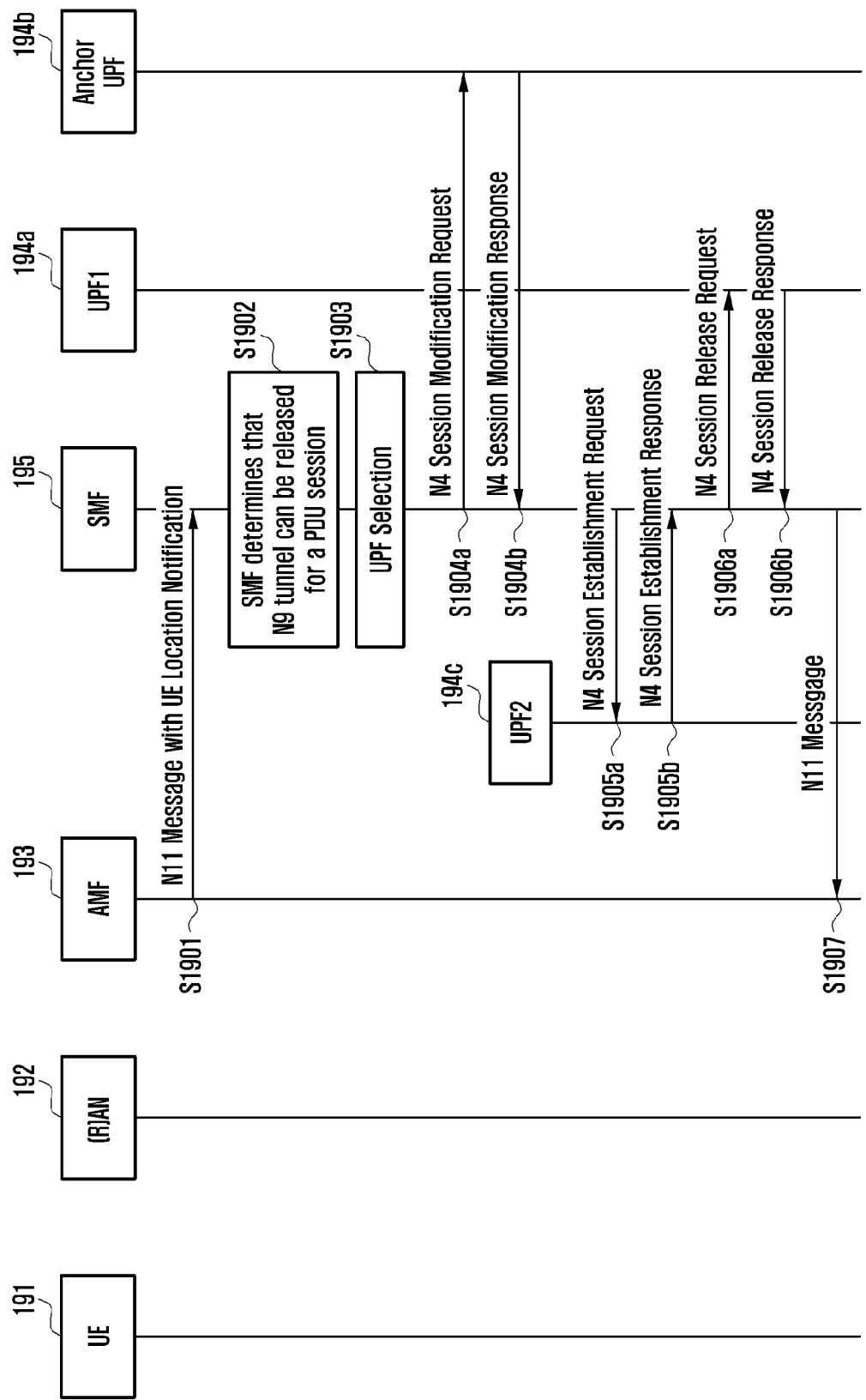
FIG. 19 is a diagram illustrating an operation for changing an N9 tunnel with respect to a PDU session composed of a plurality of UPFs according to an embodiment.

FIG. 19 illustrates a procedure of setting up an anchor UPF and a new N9 tunnel through selection of a UPF suitable to a new UE location.

More specifically, an AMF 193 transmits an N11 message for notifying an SMF 195 of a UL location (S1901), and the SMF 195 determines release of an N9 tunnel for a PDU session based on this (S1902). Further, the SMF 195 selects a UPF, and performs a PDU session modification procedure with the anchor UPF at operations S1904a and S1904b.

Further, at operations S1905a and S1905b, the SMF 195 perform a session setup process with a newly selected UPF2 194c, and at operations S1906a and S1906b, the SMF 195 performs a session release process with the existing UPF1 194a. Thereafter, the SMF 195 may notify the AMF 193 of the UPF change through the N11 message (S1907).

In an embodiment, a procedure of performing N9 tunnel maintenance/release and change in accordance with another condition in addition to UE location information. As an example, the process may include a change of a QoS profile allocated to a PDU session. In addition, a management scheme related to the maintenance/release and change of the N9 tunnel may receive a dynamic load state of a UPF constituting the N9 tunnel as an input to be performed. In addition, the management scheme related to the maintenance/release and change of the N9 tunnel may receive UPF functionality/capability as an input to be performed. In addition, the management scheme related to the maintenance/release and change of the N9 tunnel may receive a UE mobility pattern as an input to be performed.

Figure 20:
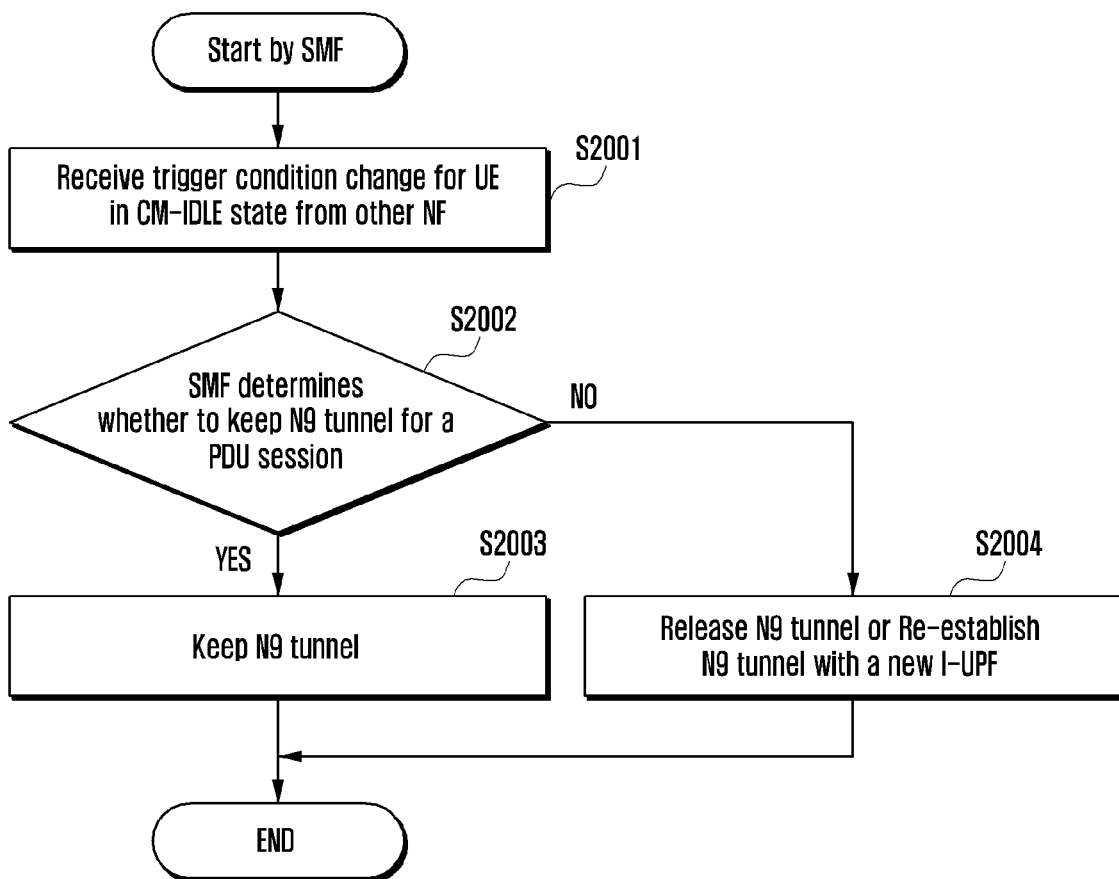
FIG. 20 is a diagram illustrating an operation for releasing an N9 tunnel in case where an SMF receives a trigger condition for releasing the N9 tunnel with respect to a PDU session composed of a plurality of UPFs according to an embodiment.

FIG. 20 is a diagram illustrating an operation for releasing an N9 tunnel in case where an SMF receives a trigger condition for releasing the N9 tunnel with respect to a PDU session composed of a plurality of UPFs according to an embodiment.

More specifically, an SMF may receive a change of a trigger condition for UE in a CM-IDLE state (S2001). Based on this, the SMF may determine whether to maintain an N9 tunnel for a PDU session (S2002). As an example, the SMF may determine to maintain the N9 tunnel in accordance with the changed trigger condition (S2003), and unlike this, the SMF may determine to release the N9 tunnel or to reestablish a new I-UPF and the N9 tunnel in accordance with the changed trigger condition (S2004).

Figure 21:
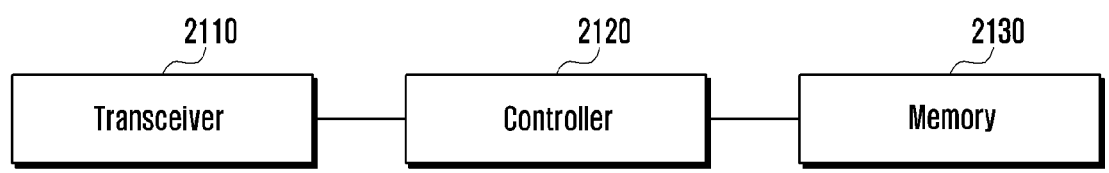
FIG. 21 is a block diagram illustrating the SMF in a network according to an embodiment of the present invention.

FIG. 21 is a block diagram illustrating the SMF in a network according to an embodiment of the present invention.

As illustrated in FIG. 21, a SMF entity according to the present disclosure may include a transceiver 2110, a memory 2130 and a controller 2120 coupled with the transceiver 2110 and the memory 2130.

In an embodiment, the controller 2120 is configured to control the transceiver 2110 to transmit a first message, requesting a location change notification for a terminal in an idle state, to an access and mobility management function (AMF) entity, to receive a second message, including information on a changed location of the terminal, from the AMF entity. And, the controller 2120 is configured to determine whether to maintain at least one of a plurality of user plane functions (UPFs) included in the PDU session for the terminal based on the second message.

Figure 22:
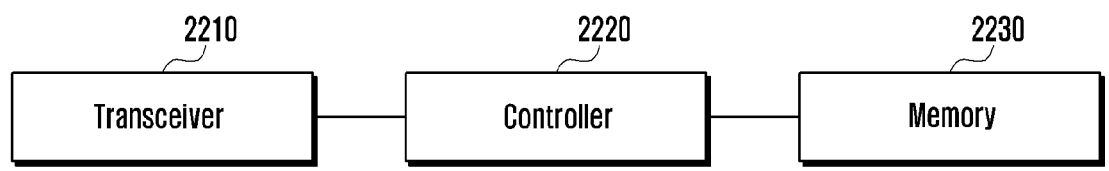
FIG. 22 is a block diagram illustrating the AMF in the network according to an embodiment of the present invention.

FIG. 22 is a block diagram illustrating the AMF in the network according to an embodiment of the present invention.

As illustrated in FIG. 22, an AMF entity according to the present disclosure may include a transceiver 2210, a memory 2230 and a controller 2220 coupled with the transceiver 2210 and the memory 2230.

In an embodiment, the controller 2220 is configured to control the transceiver 2210 to receive a first message, requesting a location change notification for a terminal in an idle state, from a session management function (SMF) entity, and to transmit a second message, including information on a changed location of the terminal, to the SMF entity based on the first message if the location change of the terminal is detected, wherein the second message is used to determine whether to maintain at least one of a plurality of user plane functions (UPFs) included in the PDU session for the terminal by the SMF entity.

Figure 23:
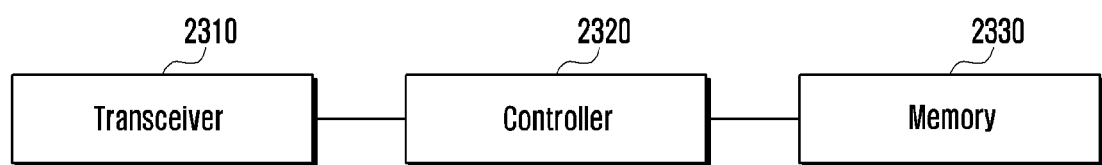
FIG. 23 is a block diagram illustrating the terminal in the network according to an embodiment of the present invention.

FIG. 23 is a block diagram illustrating the terminal in the network according to an embodiment of the present invention.

As illustrated in FIG. 23, a terminal according to the present disclosure may include a transceiver 2310, a memory 2330 and a controller 2320 coupled with the transceiver 2310 and the memory 2330.

The transceiver 2310 may transmit/receive a signal to/from a base station which communicates with the AMF/UPF of the SMF according to the present disclosure. The signal may include control information and data. Also, the controller 2320 may control a series of processes so that the terminal can operate according to the embodiments of the present disclosure.

Although embodiments of the present disclosure have been described in the specification and drawings, these are merely used as general meanings to assist those of ordinary skill in the art to gain a comprehensive understanding of the present disclosure, and do not limit the scope of the present disclosure. It will be apparent to those of ordinary skill in the art to which the present disclosure pertains that various modifications are possible based on the technical concept of the present disclosure in addition to the embodiments disclosed herein. Further, if needed, the respective embodiments may be combined with each other to be operated.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a session management function (SMF) entity in a wireless communication system, the method comprising:
   determining a specific area, the specific area being identified based on a cell identifier, a base station identifier, or a list of tracking areas;
   transmitting, to an access and mobility management function (AMF) entity, a first message for requesting information on a location of a terminal for the specific area;
   receiving, from the AMF entity, a second message including the information on the location of the terminal;
   identifying whether the terminal has moved out of a service area of an existing intermediate user plane function (UPF), based on the information on the location of the terminal; and
   determining whether to maintain the existing intermediate UPF in case that the terminal has moved out of the service area of the existing intermediate UPF.

2. The method of claim 1, wherein the specific area is determined based on the service area of the existing intermediate UPF.

3. The method of claim 1, further comprising:
   removing a tunnel between the existing intermediate UPF and an anchor UPF in case that it is determined not to maintain the existing intermediate UPF.

4. The method of claim 3, further comprising:
   allocating a tunnel between another intermediate UPF and the anchor UPF.

5. The method of claim 4, wherein the other intermediate UPF is determined based on a dynamic load.

6. A method performed by an access and mobility management function (AMF) entity in a wireless communication system, the method comprising:
   receiving, from a session management function (SMF) entity, a first message for requesting information on a location of a terminal for a specific area, the specific area being determined by the SMF entity, the specific area being identified based on a cell identifier, a base station identifier, or a list of tracking areas;
   identifying the location of the terminal for the specific area based on the first message; and
   transmitting, to the SMF entity, a second message including information on a location change of the terminal,
   wherein the information on the location change of the terminal is used by the SMF entity to identify whether the terminal has moved out of a service area of an existing intermediate user plane function (UPF), and
   wherein whether to maintain the existing intermediate UPF is determined by the SMF entity in case that the terminal has moved out of the service area of the existing intermediate UPF.

7. The method of claim 6, wherein the specific area is determined based on the service area of the existing intermediate UPF.

8. The method of claim 6,
   wherein a tunnel between the existing intermediate UPF and an anchor UPF is removed by the SMF entity in case that it is determined by the SMF entity not to maintain the existing intermediate UPF.

9. The method of claim 8, wherein a tunnel between another intermediate UPF and the anchor UPF is allocated by the SMF entity.

10. The method of claim 9, wherein the other intermediate UPF is determined by the SMF entity based on a dynamic load.

11. A session management function (SMF) entity in a wireless communication system, comprising:
    a transceiver; and
    a controller coupled with the transceiver and configured to control to:
    determine a specific area, the specific area being identified based on a cell identifier, a base station identifier, or a list of tracking areas;
    transmit, to an access and mobility management function (AMF) entity, a first message for requesting information on a location of a terminal for the specific area;
    receive, from the AMF entity, a second message including the information on the location of the terminal;
    identify whether the terminal has moved out of a service area of an existing intermediate user plane function (UPF), based on the information on the location of the terminal; and determine whether to maintain the existing intermediate UPF in case that the terminal has moved out of the service area of the existing intermediate UPF.

12. The SMF entity of claim 11, wherein the specific area is determined based on the service area of the existing intermediate UPF.

13. The SMF entity of claim 11, wherein the controller is further configured to control to remove a tunnel between the existing intermediate UPF and an anchor UPF in case that it is determined not to maintain the existing intermediate UPF.

14. The SMF entity of claim 13, wherein the controller is further configured to control to allocate a tunnel between another intermediate UPF and the anchor UPF.

15. The SMF entity of claim 14, wherein the other intermediate UPF is determined based on a dynamic load.

16. An access and mobility management function (AMF) entity in a wireless communication system, comprising:
 a transceiver; and
 a controller coupled with the transceiver and configured to control to:
 receive, from a session management function (SMF) entity, a first message for requesting information on a location of a terminal for a specific area, the specific area being determined by the SMF entity, the specific area being identified based on a cell identifier, a base station identifier, or a list of tracking areas;
 identify the location of the terminal for the specific area based on the first message; and
 transmit, to the SMF entity, a second message including information on a location change of the terminal,
 wherein the information on the location change of the terminal is used by the SMF entity to identify whether the terminal has moved out of a service area of an existing intermediate user plane function (UPF), and
 wherein whether to maintain the existing intermediate UPF is determined by the SMF entity in case that the terminal has moved out of the service area of the existing intermediate UPF.

17. The AMF entity of claim 16, wherein the specific area is determined based on the service area of the existing intermediate UPF.

18. The AMF entity of claim 16, wherein a tunnel between the existing intermediate UPF and an anchor UPF is removed by the SMF entity in case that it is determined by the SMF entity not to maintain the existing intermediate UPF.

19. The AMF entity of claim 18, wherein a tunnel between another intermediate UPF and the anchor UPF is allocated by the SMF entity.

20. The SMF entity of claim 19, wherein the other intermediate UPF is determined by the SMF entity based on a dynamic load.

* * * * *